(12) United States Patent
Takakuta et al.

(10) Patent No.: US 10,165,786 B2
(45) Date of Patent: Jan. 1, 2019

(54) PASTRY BAG, AUXILIARY MEMBER, DECORATION FORMING TOY AND DECORATION FORMING TOY SET

(71) Applicant: EPOCH COMPANY, LTD., Tokyo (JP)

(72) Inventors: Mio Takakuta, Tokyo (JP); Yuriko Ono, Tokyo (JP); Tomomi Takeda, Tokyo (JP)

(73) Assignee: EPOCH COMPANY, LTD., Tokyo (JP)

(*) Notice: Subject to any disclaimer, the term of this patent is extended or adjusted under 35 U.S.C. 154(b) by 0 days.

(21) Appl. No.: 15/797,240

(22) Filed: Oct. 30, 2017

(65) Prior Publication Data

US 2018/0116244 A1 May 3, 2018

(30) Foreign Application Priority Data

Nov. 2, 2016 (JP) .................................. 2016-214771

(51) Int. Cl.
*A23G 3/28* (2006.01)
*B05C 17/005* (2006.01)
*A21C 15/00* (2006.01)
*B65D 35/38* (2006.01)
*B67B 7/86* (2006.01)

(52) U.S. Cl.
CPC .............. *A23G 3/28* (2013.01); *A21C 15/005* (2013.01); *B05C 17/0052* (2013.01); *B05C 17/00513* (2013.01); *B05C 17/00516* (2013.01); *B05C 17/00583* (2013.01); *B65D 35/38* (2013.01); *B67B 7/28* (2013.01)

(58) Field of Classification Search
CPC .......... A23G 3/28; A21C 15/005; B67B 7/28; B67B 7/26; B65D 35/38; B65D 35/00; B05C 17/00503; B05C 17/00513; B05C 17/00516; B05C 17/0052; B05C 17/00583
USPC ...... 118/14, 24, 300; 222/107, 46–462, 568, 222/571; 426/115
See application file for complete search history.

(56) References Cited

U.S. PATENT DOCUMENTS 4,271,982 A * 6/1981 Niksich ................ B65D 47/248
222/501
4,589,854 A 5/1986 Smith
5,527,179 A 6/1996 Mochizuki
(Continued)

FOREIGN PATENT DOCUMENTS

CN 1112813 A 12/1995
CN 101607142 A 12/2009
(Continued)

OTHER PUBLICATIONS

JP Notification of Reasons for Refusal dated Mar. 9, 2017 for JP 2016-214771, including English translation.
(Continued)

*Primary Examiner* — Laura Edwards
(74) *Attorney, Agent, or Firm* — Drinker Biddle & Reath LLP (57) ABSTRACT

A pastry bag includes: a container containing a creamy substance; a nozzle connected to the container; and an auxiliary member. The auxiliary member includes: a fixing portion fixed to the nozzle; and a positioning portion to be brought into contact with a creation surface on which a decoration is to be created.

7 Claims, 8 Drawing Sheets

(56) References Cited

U.S. PATENT DOCUMENTS

2003/0152659 A1* 8/2003 McCloskey .......... A23G 3/0257
                                                    425/256
2015/0273516 A1   10/2015 Starr et al.
2017/0325466 A1* 11/2017 Folkmar .............. A21C 15/005

FOREIGN PATENT DOCUMENTS

| CN | 203388157 U | 1/2014 |
| CN | 204222531 U | 3/2015 |
| CN | 104797141 A | 7/2015 |
| CN | 204907687 U | 12/2015 |
| EP | A2-0361049 | 4/1990 |
| GB | 401133 A | 11/1933 |
| GB | 971758 A | 10/1964 |
| GB | 2246941 A | 2/1992 |
| JP | S36-018894 U | 7/1961 |
| JP | H03-97082 U | 10/1991 |
| JP | H09-94067 A | 4/1997 |
| JP | 2010-000152 A | 1/2010 |
| KR | A-2001-0056699 | 7/2001 |
| WO | WO-2016/079579 A1 | 5/2016 |

OTHER PUBLICATIONS

KR Office Action dated Feb. 26, 2018 from corresponding Korean patent application No. 10-2017-0140962 (with attached English-language translation).

Examination report No. 1 for standard patent application dated Mar. 29, 2018 in Australian Patent Application No. 2017254899.

First Office Action dated Nov. 7, 2018 in Chinese Patent Application No. 201711063495.2 (9 pages) with an English translation (10 pages).

* cited by examiner

PASTRY BAG, AUXILIARY MEMBER, DECORATION FORMING TOY AND DECORATION FORMING TOY SET

CROSS-REFERENCE TO RELATED APPLICATION(S)

This application is based on and claims priority from Japanese Patent Application No. 2016-214771 filed on Nov. 2, 2016, the entire contents of which are incorporated herein by reference.

BACKGROUND

1. Field of the Invention

One or more embodiments of the present invention relate to a pastry bag for squeezing a creamy substance, an auxiliary member for the pastry bag, a decoration forming toy and a decoration forming toy set.

2. Description of Related Art

There has been proposed a toy for creating simulated food such as simulated cake by using a tube filled with a creamy resin simulating whipped cream. For example, JP-A-2010-000152 discloses a toy set including a resin tube, that is, a tubular container filled with a synthetic resin of a creamy resin. This toy set can be used for enjoying easily forming a decoration toy of highly decorative simulated food that can be used as an accessory looking like beautiful food.

JP-A-H09-094067 discloses a pastry bag for cream used in squeezing creams for food in general. This pastry bag for cream includes a cylindrical squeezing nozzle having a squeezing outlet, and a substantially triangular tip sharpened toward the center and a substantially triangular notch are alternately formed to be circularly aligned at the opening edge of the squeezing outlet.

SUMMARY

In order to create beautiful decorations having uniform height and shape by squeezing a creamy substance, that is, a content of the tubular container, by using the resin tube as described in JP-A-2010-000152 or the pastry bag for cream described in JP-A-H09-094067, prescribed or higher technique is necessary for appropriately keeping a distance between the pastry bag and a surface where the creamy substance is to be piped, or for making sure the timing and the amount of squeezing the creamy substance. Therefore, if a user is not used to using the pastry bag, it is difficult to create a beautiful cream decoration.

In consideration of the above-described points, an object of one or more embodiments of the present invention is to provide a pastry bag capable of easily creating a beautiful cream decoration, an auxiliary member for the pastry bag, a decoration forming toy and a decoration forming toy set.

In one aspect of the present invention, there is provided a pastry bag including: a container containing a creamy substance; a nozzle connected to the container; and an auxiliary member including: a fixing portion fixed to the nozzle; and a positioning portion to be brought into contact with a creation surface on which a decoration is to be created, wherein the fixing portion is sandwiched between the nozzle and the container.

In another aspect of the present invention, there is provided an auxiliary member for a pastry bag including a container containing a creamy substance and a nozzle connected to the container, the auxiliary member including: a fixing portion sandwiched between the nozzle and the container; and a positioning portion to be brought into contact with a creation surface on which a decoration is to be created.

In yet another aspect of the present invention, there is provided a decoration forming toy including: a container containing a creamy substance; a nozzle connected to the container; and an auxiliary member including: a fixing portion fixed the nozzle; and a positioning portion to be brought into contact with a creation surface on which a decoration is to be created, wherein the fixing portion is sandwiched between the nozzle and the container.

In yet another aspect of the present invention, there is provided a decoration forming toy set including: a decoration forming toy; and a base, wherein the decoration forming toy includes: a container containing a creamy substance; a nozzle connected to the container; and an auxiliary member including: a fixing portion fixed to the nozzle; and a positioning portion to be brought into contact with a creation surface on which a decoration is to be created, wherein the fixing portion is sandwiched between the nozzle and the container, and wherein the base includes: a contact guide with which a tip of the positioning portion is brought into contact; and an amount guide which guides an amount of squeezing the creamy substance.

According to one or more embodiments of the present invention, a distance between the creation surface and the pastry bag can be stably retained, whereby it is possible to provide a pastry bag capable of easily creating a beautiful cream decoration having uniform height and shape, an auxiliary member for the pastry bag, a decoration forming toy and a decoration forming toy set.

BRIEF DESCRIPTION OF THE DRAWINGS

FIGS. 3A and 3B are diagrams illustrating an auxiliary member of Embodiment 1 of the present invention, and specifically.

FIGS. 4A and 4B are diagrams illustrating the auxiliary member of Embodiment 1 of the present invention, and specifically.

FIGS. 5A and 5B are diagrams illustrating a base of the decoration forming toy set of Embodiment 1 of the present invention, and specifically.

DETAILED DESCRIPTION

Embodiment 1

Figure 1:
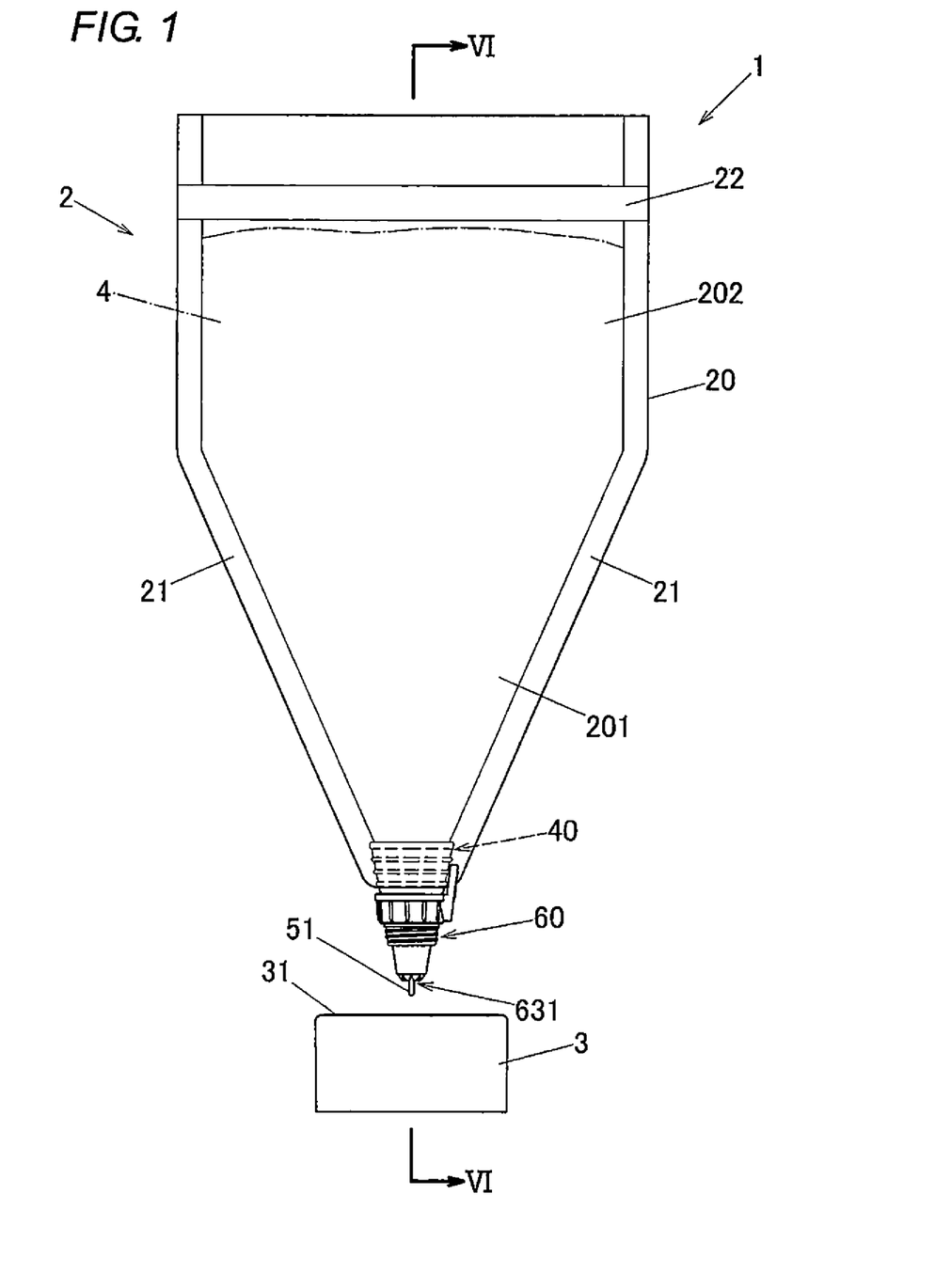
FIG. 1 is a diagram illustrating a decoration forming toy set according to Embodiment 1 of the present invention.

Embodiments of the present invention will now be described with reference to the accompanying drawings. FIG. 1 is a diagram illustrating a decoration forming toy set 1. The decoration forming toy set 1 includes a pastry bag 2 and a base 3. When a user squeezes a creamy substance 4 filled in a container 20 of the pastry bag 2 so as to move the creamy substance 4 from a rear side (an upper side in the drawing) of the container 20 to a front side (a lower side in the drawing), the creamy substance 4 can be squeezed out through an opening 631 of a nozzle 60 disposed at the tip. The squeezed creamy substance 4 is placed on an upper plate 31 of the base 3, and thus, a decoration toy simulating a pastry or the like decorated with fresh cream can be formed.

Now, the decoration forming toy set 1 using a cream resin as the creamy substance 4 and applying the pastry bag 2 to a decoration forming toy mainly to be enjoyed by children will be described. It is noted that the pastry bag 2 of the present embodiment may be filled with, instead of the cream resin, a creamy substance, such as whipped cream, to be used for general food. In this case, the pastry bag 2 can be used for decorating food such as sponge cake instead of the base 3.

Figure 2:
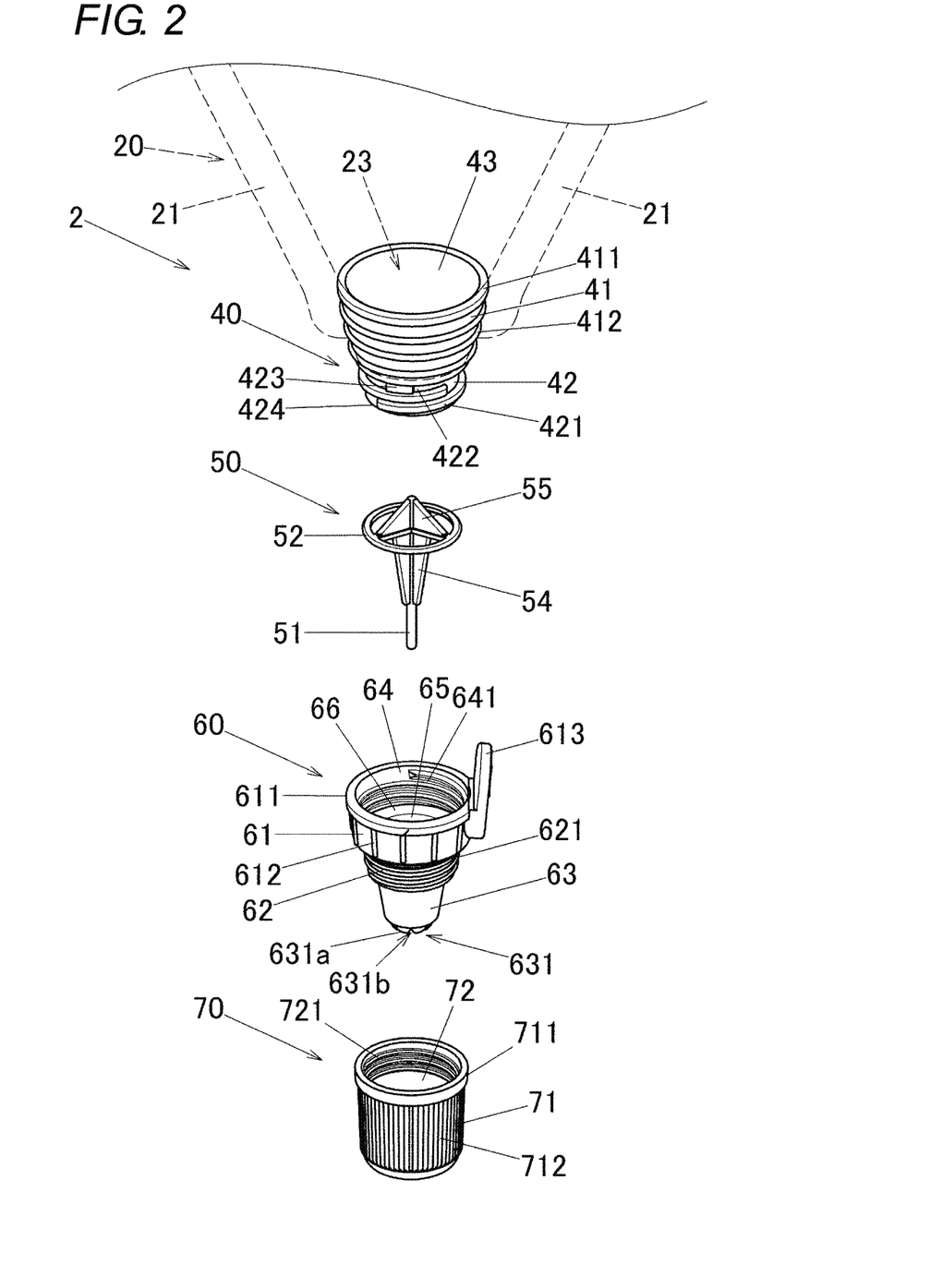
FIG. 2 is an exploded perspective view of a pastry bag of Embodiment 1 of the present invention.

FIG. 2 is an exploded perspective view of the pastry bag 2. In the following description of the pastry bag 2, a side closer to the container 20 is designated as the front side, and a side closer to the nozzle 60 is designated as the rear side. The pastry bag 2 includes the container 20, a connecting section 40, an auxiliary member 50, the nozzle 60, and a cap 70. The container 20 is formed by placing two flexible sheet members of a polyvinyl chloride resin or the like in a front surface side and a rear surface side of the drawing as illustrated mainly in FIG. 1 to be put on top of each other, and by adhering sides 21 through thermocompression bonding or the like. A front portion 201 of the container 20 is formed to have a width increasing from its front side end toward its rear side end. A rear portion 202 of the container 20 is formed to have substantially the same width. Also at a rear side end 22 of the container 20, the two overlaid sheet members are caused to adhere to each other by the thermocompression bonding or the like so that the container 20 can be closed in the shape of a bag.

The container 20 thus formed is filled with the creamy substance 4 in a vacuum state. The creamy substance 4 simulates whipped cream, and can contain, for example, a synthetic sizing agent, an acrylic resin, a cellulose, a stabilizer, a preservative and the like. Accordingly, when exposed to the air and dried, the creamy substance 4 is cured. Besides, the creamy substance 4 may be colored by adding a coloring agent thereto.

As shown in FIG. 2, the connecting section 40 has a rear portion 41 and a front portion 42 having an outer diameter smaller than that of the rear portion 41, and is formed in a substantially cylindrical shape as a whole. The rear portion 41 is formed to have a diameter decreasing toward the front side (downward in the drawing). In a rear edge of the rear portion 41, a flange 411 is formed over the whole circumference. On the outer circumferential surface of the rear portion 41, a plurality of ridges 412 having a larger diameter than the outer circumferential surface are formed to extend the circumferential direction. The plural ridges 412 are disposed in the front-to-rear direction.

The container 20 has an opening 23 at the front end. The opening 23 is connected to the connecting section 40. The opening 23 is formed by the two sheet members adhering to each other in the sides 21 excluding their front ends. Besides, in the vicinity of the opening 23, the sides 21 are caused to adhere to each other so that the inner edge of the opening 23 can adhere tightly to the rear portion 41 of the connecting section 40. Since the ridges 412 provided on the rear portion 41 are caused to tightly adhere to the inside of the opening 23, the creamy substance 4 can be prevented from leaking through a gap otherwise formed between the outer circumferential surface of the rear portion 41 and the opening 23.

A male screw portion 421 is formed on the outer circumferential surface of the front portion 42. In the vicinity of the rear end of a groove 422 of the male screw portion 421, a catching projection 423 is formed in the shape of a flat projection. The catching projection 423 is formed to be lower than a screw thread of the male screw portion 421.

Figure 6:
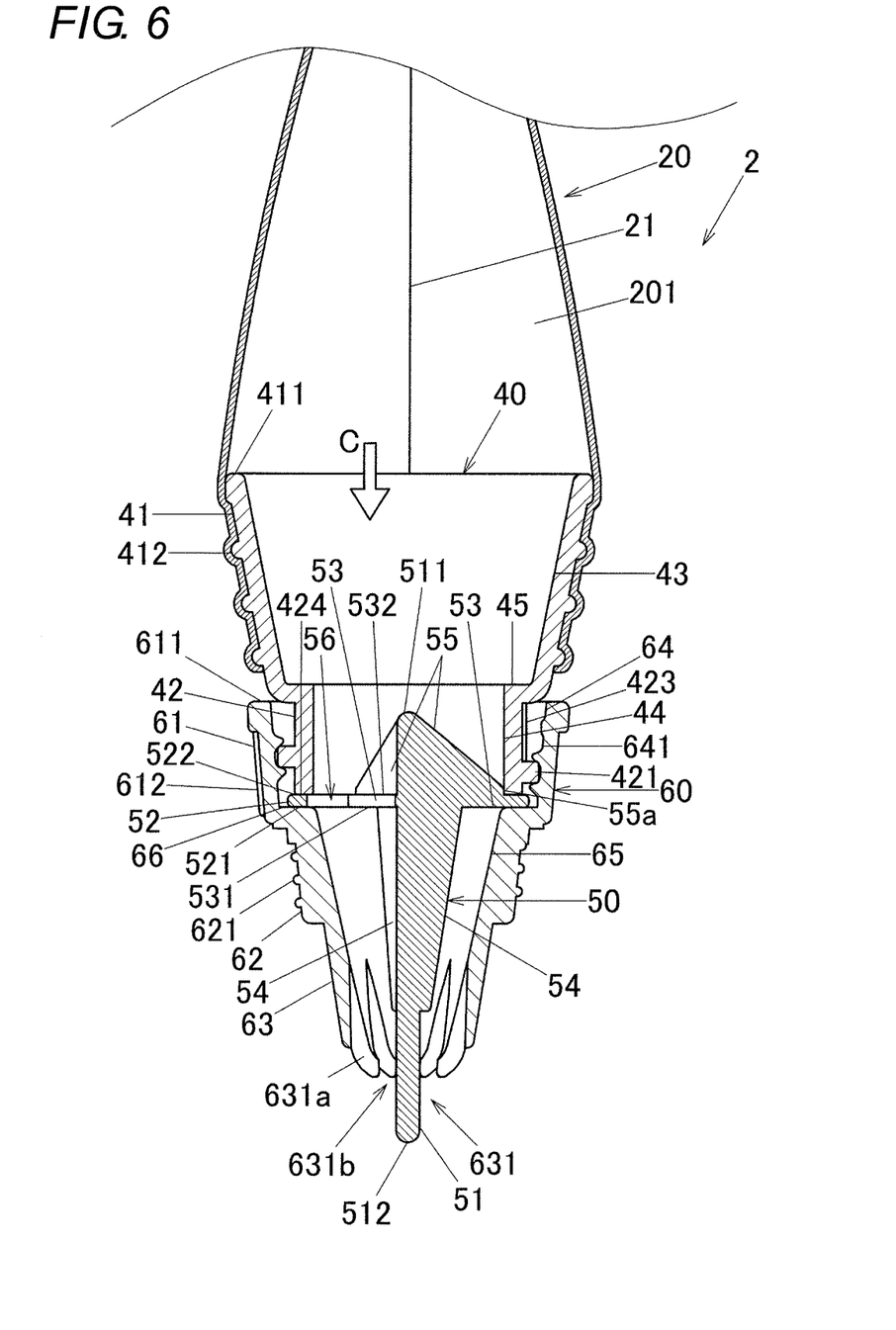
FIG. 6 is a cross-sectional view of the pastry bag of Embodiment 1 of the present invention taken on line VI-VI of FIG. 1.

Besides, as illustrated mainly in FIG. 6, the connecting section 40 has a rear inner wall 43 and a front inner wall 44 having an inner diameter smaller than the that of the rear inner wall 43. In a step-like boundary between the rear inner wall 43 and the front inner wall 44, a step 45 having a flat surface facing the rear side is formed. Furthermore, a ring-shaped front contact portion 424 is formed at the front end of the connecting section 40.

Referring to FIG. 2 again, the nozzle 60 has a rear portion 61, a middle portion 62 having an outer diameter smaller than that of the rear portion 61, and a front portion 63 having an outer diameter smaller than that of the middle portion 62, and is formed in a substantially cylindrical shape as a whole. A flange 611 is formed at the rear edge of the rear portion 61 over the whole circumference. A plurality of ribs 612 are formed on the outer circumferential surface of the rear portion 61 to extend in the front-to-back direction (i.e., the axial direction of the cylindrical nozzle 60). In a part of the side surface of the rear portion 61, a display plate 613 is formed to stand backward. On a surface on the outer circumferential side (the right-hand side in FIG. 2) of the display plate 613, a shape type of the opening 631 of the nozzle 60 can be illustrated using letters or figures. The shape type includes the shape and the size of the opening 631. Besides, a male screw portion 621 is formed on the outer circumferential surface of the middle portion 62.

The front portion 63 is formed to have an outer diameter gradually decreased toward the front side. An opening 631 is formed at the front end of the front portion 63. The opening 631 can be provided with an opening shape generally used in a pastry bag for whipped cream. In the present embodiment, an eight-pointed star-shaped type is used. Accordingly, the opening 631 is formed by arranging eight pointed plates 631a circularly with their pointed apexes facing the center of the opening 631 in a plan view. Between the pointed plates 631a, notches 631b are respectively formed.

Besides, the nozzle 60 includes, as illustrated mainly in FIG. 6, a rear inner wall 64 and a front inner wall 65 having an inner diameter smaller than that of the rear inner wall 64. On the rear inner wall 64, a female screw portion 641 to be screwed with the male screw portion 421 of the connecting section 40 is formed. The front inner wall 65 is formed from a front end of the rear inner wall 64 to the opening 631, and is formed to have an inner diameter gradually decreased toward the front side. In a boundary between the rear inner wall 64 and the front inner wall 65, a step-like rear contact portion 66 having a flat surface facing the rear side is formed. Incidentally, screwed engagement between the connecting section 40 and the nozzle 60 can be retained by screwing the male screw portion 421 into the female screw portion 641 such that the catching projection 423 comes into contact with a screw thread of the female screw portion 641.

Figure 3A:
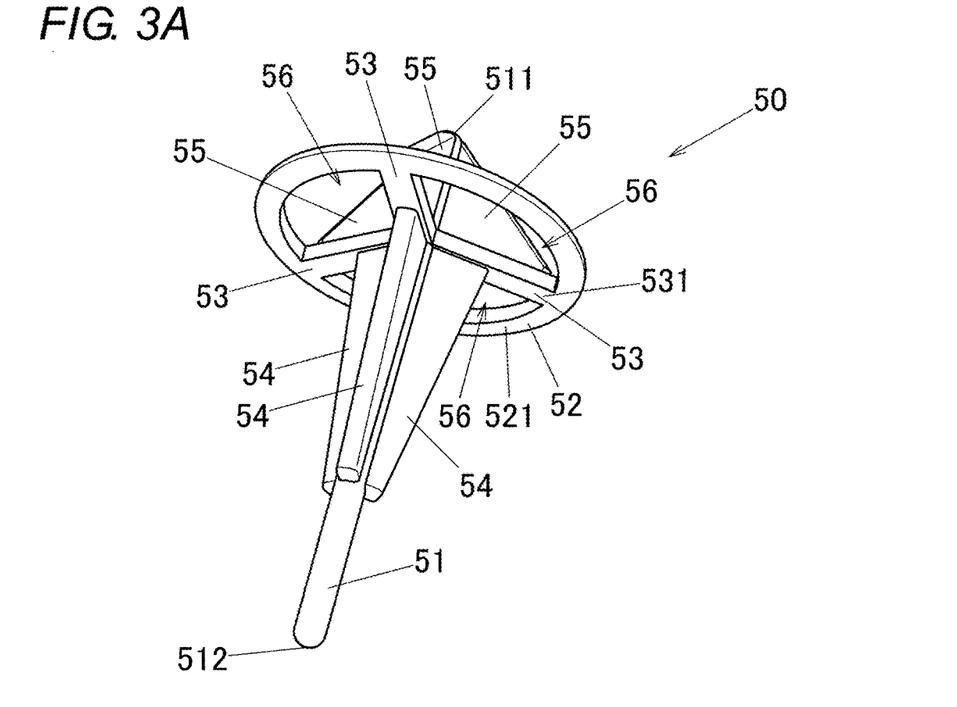
FIG. 3A is a perspective view thereof taken from a front side.
Figure 3B:
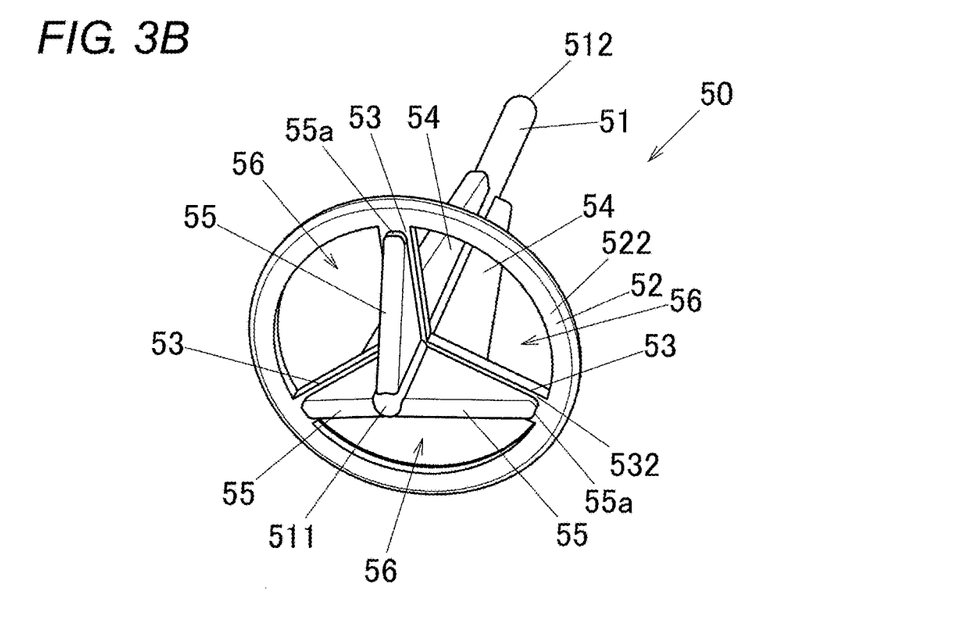
FIG. 3B is a perspective view thereof taken from a rear side.
Figure 4A:
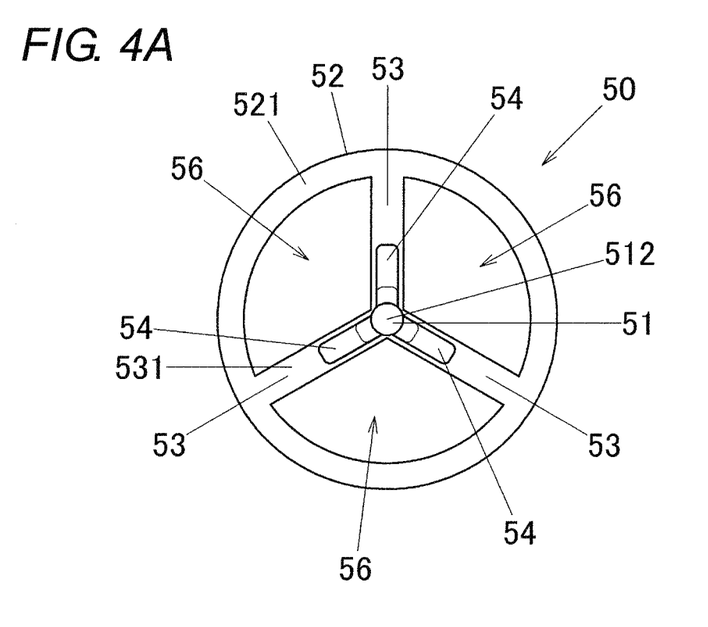
FIG. 4A is a plan view thereof taken from the front side.
Figure 4B:
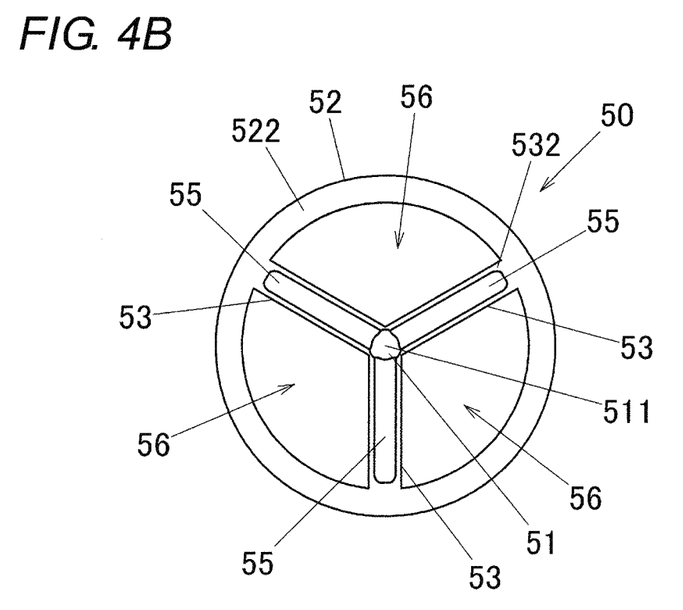
FIG. 4B is a plan view thereof taken from the rear side.

The auxiliary member 50 is disposed inside the connecting section 40 and the nozzle 60. Here, referring to FIGS. 3A, 3B, 4A and 4B, the auxiliary member 50 will be described in detail. FIG. 3A is a perspective view of the auxiliary member 50 taken from the front side, and FIG. 3B is a perspective view of the auxiliary member 50 taken from the rear side. FIG. 4A is a plan view of the auxiliary member 50 taken from the front side, and FIG. 4B is a plan view of the auxiliary member 50 taken from the rear side.

The auxiliary member 50 includes a column-shaped (or bar-shaped) positioning portion 51 having a long axis in the front-to-back direction, and a ring-shaped fixing portion 52. The positioning portion 51 is disposed to pass through substantially the center of the fixing portion 52. Besides, the fixing portion 52 is disposed behind the positioning portion 51. The positioning portion 51 and the fixing portion 52 are connected to each other via prismatic connecting rods 53. Front surfaces 531 of the connecting rods 53 are formed at the same level as a front surface 521 of the fixing portion 52 (see FIG. 3A or FIG. 4A). Rear surfaces 532 of the connecting rods 53 are formed at the same level as a rear surface 522 of the fixing portion 52 (see FIG. 3B or FIG. 4B).

Between the connecting rods 53 and a part of the positioning portion 51 on the front surfaces 531 side, front ribs 54 are provided. Each front rib 54 is formed in the shape of a right trapezoidal plate in side view. Each front rib 54 is formed to extend from substantially the center of the corresponding connecting rod 53 to a part of the positioning portion 51 beyond its center toward the front side. Each front rib 54 is formed in the shape of a plate extending in the front-to-back direction. The thickness of the front ribs 54 is smaller than the width of the connecting rods 53 and the diameter of the positioning portion 51.

On the other hand, between the connecting rods 53 and a part of the positioning portion 51 on the rear surfaces 532 side, rear ribs 55 are provided. Each rear rib 55 is formed in the shape of a right triangular plate in side view. Incidentally, since these rear ribs 55 are thus formed in a triangular shape, even when the auxiliary member 50 is left on a floor or the like, the positioning portion 51 of the auxiliary member 50 falls sideways so that an injury otherwise caused can be avoided in safety. Each rear rib 55 is formed to extend from the outside end (namely, the end closer to the fixing portion 52) of the corresponding connecting rod 53 to a rear end 511 of the positioning portion 51. Besides, an outside end 55a of each rear rib 55 on the side closer to the fixing portion 52 is substantially parallel to the long axis of the positioning portion 51, and is C-chamfered by a plane substantially vertical to the rear rib 55. The thickness of the rear ribs 55 is smaller than the width of the connecting rods 53 and the diameter of the positioning portion 51.

The connecting rods 53, the front ribs 54 and the rear ribs 55 of the present embodiment are disposed, as illustrated in the plan view of FIG. 4A and FIG. 4B, radially around the positioning portion 51 toward the fixing portion 52. Besides, the connecting rods 53, the front ribs 54 and the rear ribs 55 are disposed at substantially the same angle around the long axis of the positioning portion 51. In the present embodiment, the connecting rods 53, the front ribs 54 and the rear ribs 55 are provided each in number of three. Accordingly, the connecting rods 53, the front ribs 54 and the rear ribs 55 are disposed at about 120 degrees around the long axis of the positioning portion 51.

Since the positioning portion 51 and the fixing portion 52 are thus connected to each other via the connecting rods 53, substantially fan-shaped passages 56 through which the creamy substance 4 passes during use of the pastry bag 2 are formed in the auxiliary member 50.

Referring to FIG. 2 again, the cap 70 is formed in a cylindrical shape having a bottom on the front end side. A flange 711 is formed at the rear edge of the cap 70 over the whole circumference. On an outer circumferential surface 71 of the cap 70, a plurality of vertical ribs 712 are formed. A female screw portion 721 to be screwed with the male screw portion 621 of the nozzle 60 is formed in a rear end portion of an inner wall 72 of the cap 70.

Figure 5A:
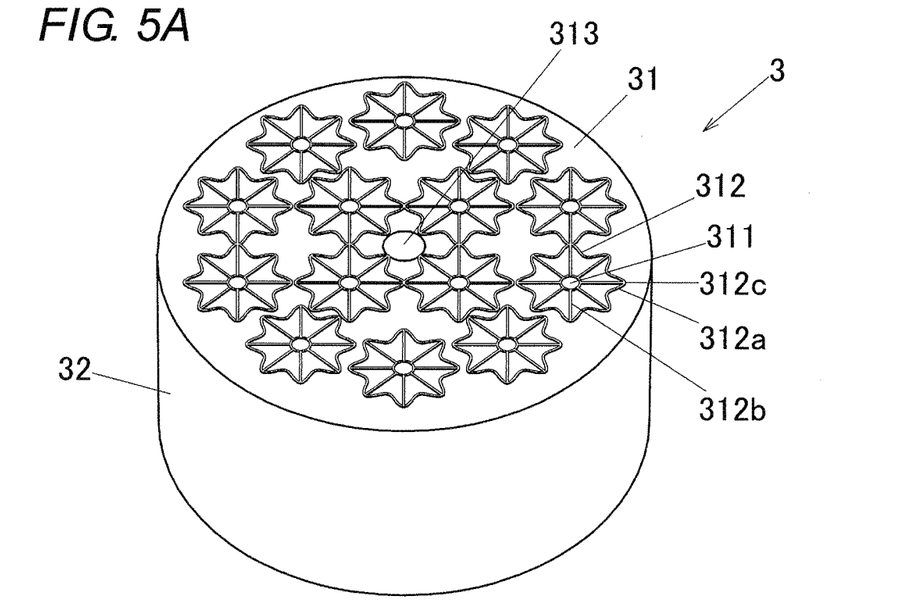
FIG. 5A is a perspective view thereof taken from above.
Figure 5B:
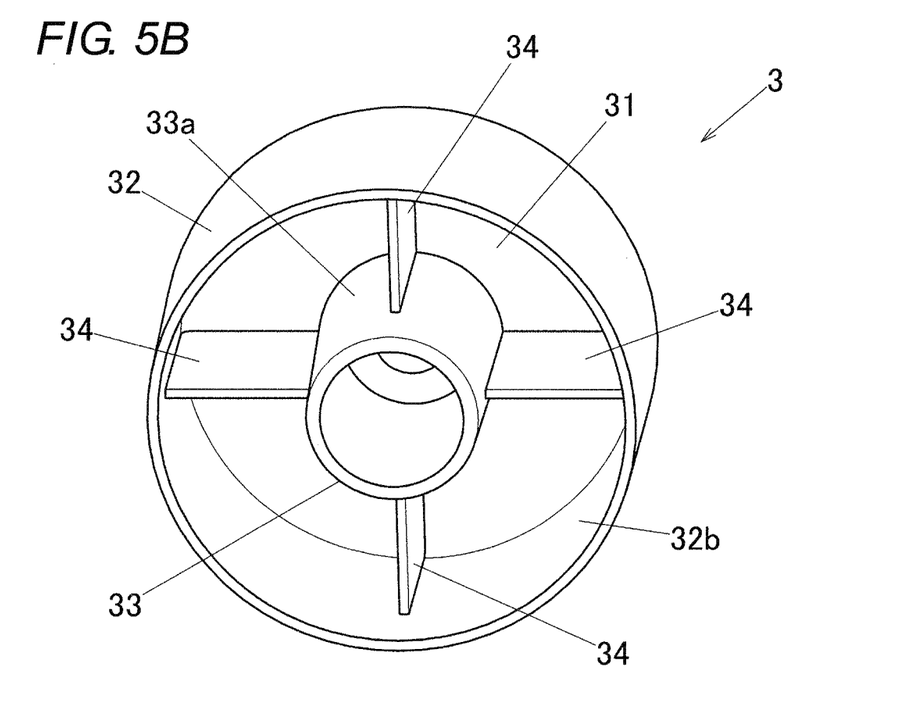
FIG. 5B is a perspective view thereof taken from below.

Next, the base 3 will be described. FIG. 5A is a perspective view of the base 3 taken from above, and FIG. 5B is a perspective view of the base 3 taken from below. Incidentally, in the description of the base 3, a side closer to the upper plate 31 in FIGS. 5A and 5B is designated as the upper side, and the opposite side is designated as the lower side. The base 3 is formed in a substantially cylindrical shape. On the upper plate 31 of the base 3, a plurality of contact guides 311 and amount guides 312 are provided.

Referring to FIG. 5A, each contact guide 311 is formed in the shape of a circular recess. The contact guide 311 is used for positioning the pastry bag 2 by bringing a front end 512 of the positioning portion 51 of the auxiliary member 50 into contact with the contact guide 311. In this manner, the height and the position in every direction of the pastry bag 2 with respect to the base 3 can be easily stably retained. Incidentally, the contact guide 311 of the present embodiment is formed as a recess in substantially the same shape as the shape of the front end 512 of the positioning portion 51. Therefore, the front surface of the front end 512 can be placed in substantially surface contact with the bottom of the contact guide 311.

Alternatively, the contact guide 311 may be formed to have a larger diameter than the outline of the positioning portion 51, so that the positioning portion 51 can be guided in its position by bringing the tip of the front end 512 into contact with the bottom of the contact guide 311. Alternatively, the contact guide 311 may be provided as a recess or a hole having a smaller diameter than the positioning portion 51, so that the position of the front end 512 of the positioning portion 51 can be supported by the inner edge of the recess or the hole.

Each amount guide 312 is provided around the corresponding contact guide 311 with the contact guide 311 set at the center. The amount guide 312 has an outline guide 312a and a radial guide 312b drawn with a line protruding beyond the upper plate 31. The outline guide 312a of the amount guide 312 is formed in a star shape having eight apexes 312c. The amount guide 312 is used for allowing a user to grasp an appropriate amount of squeezing the creamy substance 4 out of the pastry bag 2.

In the base 3 of the present embodiment, fourteen combinations of the contact guide 311 and the amount guide 312 are provided on the upper plate 31. Besides, at substantially the center of the upper plate 31, a recess 313 in a substantially circular shape larger than the contact guide 311 is formed.

Referring to FIG. 5B, a side wall 32 is formed to extend toward the lower side from the outer edge of the upper plate 31 of the base 3. The base 3 is formed in the shape of a cylindrical container opened on the lower side. A cylindrical rib 33 is provided at substantially the center on the rear surface side of the upper plate 31. Besides, on the rear surface side of the upper plate 31, plate ribs 34 each connecting an outer surface 33a of the cylindrical rib 33 to an inner surface 32b of the side wall 32 are provided. The plate ribs 34 are connected also to the rear surface of the upper plate 31. Furthermore, in a plan view taken from below, the plate ribs 34 are provided in number of four at substantially 90 degrees against each other around the center of the upper plate 31. Since the cylindrical rib 33 and the plate ribs 34 are thus provided, the strength of the base 3 can be increased.

Incidentally, the contact guides 311 may be in another shape including a plurality of projections as long as the shape can be fit with the front end 512 of the positioning portion 51 brought into contact therewith. Besides, each amount guide 312 may be drawn with a groove as long as a user can visually recognize its shape. Alternatively, the contact guides 311 and the amount guides 312 may be formed with dots or lines in colors distinguishable from the base color of the upper plate 31.

FIG. 6 is a cross-sectional view of the pastry bag 2 of FIG. 1 taken on line VI-VI. This drawing illustrates merely a part in the vicinity of the nozzle 60 with the creamy substance 4 omitted. The connecting section 40 attached to the container 20 is connected to the nozzle 60 by screwing the front portion 42 with the rear inner wall 64. At this point, the rear surface 522 of the fixing portion 52 comes into contact with the front contact portion 424 of the connecting section 40, and the front surface 521 of the fixing portion 52 comes into contact with the rear contact portion 66 of the nozzle 60. As a result, the auxiliary member 50 is sandwiched between the front contact portion 424 and the rear contact portion 66 to be supported within the nozzle 60. Besides, since the outside ends 55a of the rear ribs 55 and the front inner wall 44 come close to or come into contact with each other, a shift of the auxiliary member 50 in the front-to-back or lateral direction can be reduced.

Besides, a part of the front end 512 of the positioning portion 51 of the auxiliary member 50 is disposed to protrude outward beyond the opening 631. When the auxiliary member 50 is thus disposed within the nozzle 60, the creamy substance 4 squeezed from the bag-shaped container 20 in a direction of an arrow C (namely, in the back-to-front direction) successively passes through the connecting section 40, the passages 56 of the auxiliary member 50 and the nozzle 60 to be squeezed out toward the front side of the pastry bag 2 through the opening 631. The creamy substance 4 squeezed out through the opening 631 moves toward the front side along the positioning portion 51 exposed out of the opening 631.

Next, a method for using the pastry bag 2 with the base 3 will be described. FIGS. 7A to 7D are diagrams illustrating the method for using the pastry bag 2. First, in step S1 of FIG. 7A, a user places the pastry bag 2, with the nozzle 60 disposed downward and the connecting section 40 disposed upward, in such a manner that the front end 512 of the positioning portion 51 is in contact with one contact guide 311 provided on the base 3. The pastry bag 2 can be easily placed in a position with a distance between the opening 631 and the upper plate 31 of the base 3 set to a prescribed height h predetermined by the auxiliary member 50.

Figure 7A:
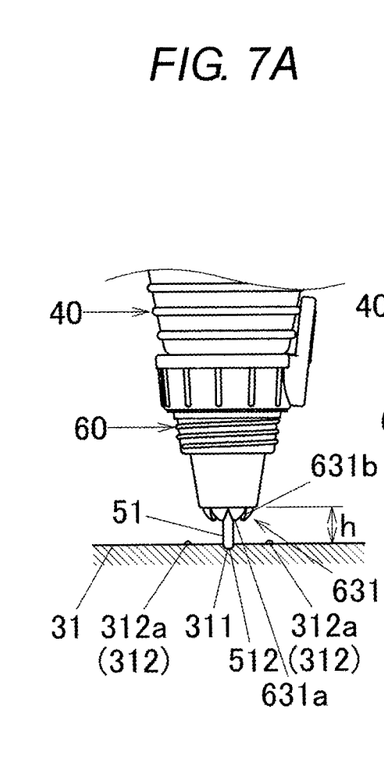
FIGS. 7A to 7D are diagrams illustrating use of the pastry bag of Embodiment 1 of the present invention in which work process proceeds in order of FIGS. 7A, 7B, 7C and 7D.
Figures 7B, 7C, 7D:
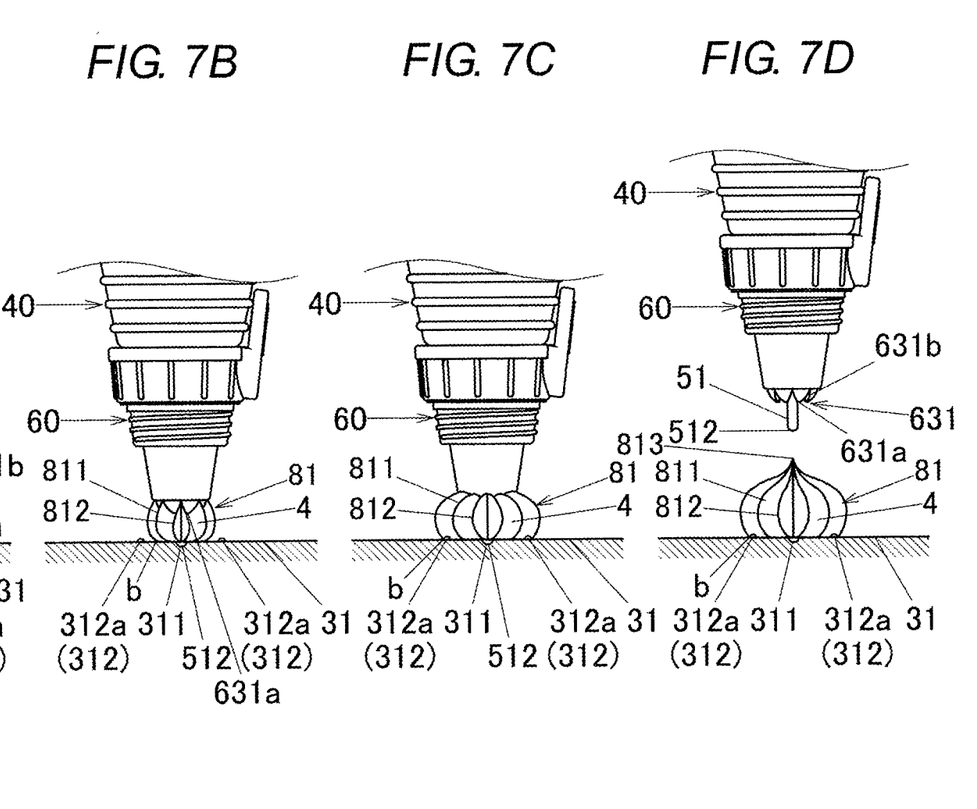

In step S2 of FIG. 7B, when the user moves the creamy substance 4 contained in the container 20 to be squeezed toward the nozzle 60, the creamy substance 4 appears outside through the opening 631. At the initial stage of the appearance of the creamy substance 4, a contact area between the creamy substance 4 and the upper plate 31 is small, and hence the creamy substance 4 is provided inside the outline guide 312a (namely, in a part of the outline guide 312a closer to the contact guide 311). When the user continues to squeeze the creamy substance 4, the creamy substance 4 squeezed out becomes larger to have a swollen side surface while increasing the contact area with the upper plate 31, and as a result, a three-dimensional cream decoration 81 can be formed. Here, a portion of the creamy substance 4 squeezed out through each notch 631b forms a side apex 811, and a portion of the creamy substance 4 squeezed out through each pointed plate 631a forms a valley 812.

The outline guide 312a indicates that the amount of squeezing the creamy substance 4 (namely, the position of a boundary b between the squeezed creamy substance 4 and the upper plate 31) is appropriate. Besides, the opening 631 of the present embodiment is in the shape of an eight-pointed star, and the outline guide 312a is also in the shape of a star having eight apexes 312c. Accordingly, the boundary b becomes substantially similar to the outline guide 312a in a plan view not illustrated. In using the pastry bag 2, the user adjusts the axial direction of the pastry bag 2 so that the side apexes 811 of the cream decoration 81 can accord with the apexes 312c of the outline guide 312a (see FIG. 5A). Accordingly, when the amount of squeezing the creamy substance 4 is increased, the outline guide 312a illustrated in FIG. 5A accords with the boundary b. In this manner, the user can easily determine whether or not an appropriate amount of the creamy substance 4 has been squeezed.

In step S3 of FIG. 7C, when the boundary b between the squeezed creamy substance 4 and the upper plate 31 substantially accords with the outline guide 312a, the user stops the squeezing operation of the pastry bag 2.

In step S4 of FIG. 7D, the user pulls up the pastry bag 2 away from the upper plate 31. In this manner, the cream decoration 81 made of the creamy substance 4 can be formed in a good shape. Besides, when dried for a prescribed period of time, the cream decoration 81 can be cured to hardness suitable for storage or use as a decoration.

Incidentally, the appropriate height h between the opening 631 and the base 3 may be different depending on the shape or size of the opening 631. In this manner, according to the pastry bag 2 of the present embodiment, the opening 631 can be set and retained at the appropriate height h owing to the auxiliary member 50.

The positioning portion 51 that determines the height of the auxiliary member 50 is provided to protrude through substantially the center of the opening 631, and hence, the movement of the squeezed creamy substance 4 and the formation of the appearance of the cream decoration 81 are never impaired.

Besides, in pulling up the pastry bag 2 in step S4 described above, the front end 512 of the positioning portion 51 pulls up the creamy substance 4 having been squeezed onto the base 3, and thus, a pointed tip 813 of the cream decoration 81 is formed. The pointed tip 813 is formed because the cream decoration 81 is pulled upward when the pastry bag 2 is separated from the cream decoration 81, and a pointed tip can be formed in a good shape in the same manner as in using a conventional pastry bag not including the auxiliary member 50. Therefore, the cream decoration 81 created by using the pastry bag 2 is never inferior in the appearance to a cream decoration formed by using a conventional pastry bag. Besides, since the positioning portion 51 is provided inside the opening 631, the user can visually recognize the squeezed cream substance 4 in the same manner as in a case where the auxiliary member 50 is not used.

Furthermore, although the pastry bag 2 is set, when used, to be substantially vertical to the base 3 in steps S1 to S4 described above, the pastry bag 2 may be inclined, when used, depending on the shape of a cream decoration 81 desired to create. Even in this case, when the front end 512 of the positioning portion 51 is brought into contact with the base 3, the distance between the opening 631 of the nozzle 60 and the upper plate 31 of the base 3 can be set to the predetermined height, and hence, a beautiful cream decoration 81 can be stably created.

Alternatively, the user may squeeze the creamy substance 4 in the squeezing operation performed in steps S2 and S3 while rotating the pastry bag 2 around the center of the opening 631. Thus, a cream decoration 81 having star-shaped side apexes 811 spirally rotated can be formed.

The pastry bag 2 using the auxiliary member 50 of the present embodiment has been described so far, and it is noted that a member having another structure may be used as the auxiliary member 50 as long as a distance between the opening 631 and a creation surface (which corresponds to the upper plate 31 of the base 3 in the present embodiment) can be appropriately retained.

Embodiment 2

Figure 8:
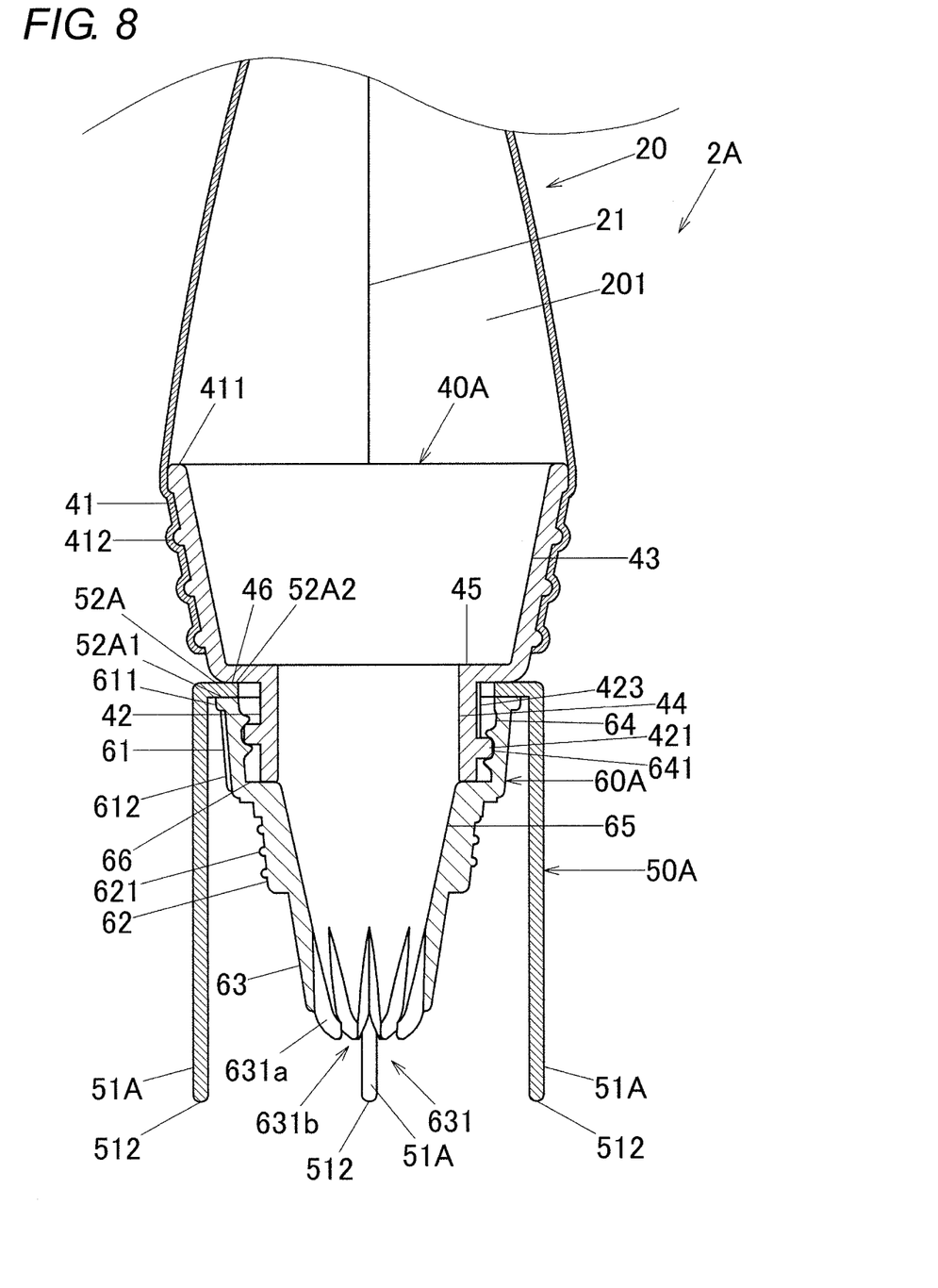
FIG. 8 is a cross-sectional view of a pastry bag according to Embodiment 2 of the present invention taken on line corresponding to line VI-VI of FIG. 1.

FIG. 8 is a cross-sectional view of a pastry bag 2A according to Embodiment 2 of the present invention. It is noted that FIG. 8 is a cross-sectional view of the pastry bag 2A taken on line corresponding to line VI-VI of the pastry bag 2 of FIG. 1. In the present embodiment, an auxiliary member 50A is used instead of the auxiliary member 50 of Embodiment 1, and a connecting section 40A and a nozzle 60A are used respectively instead of the connecting section 40 and the nozzle 60. Incidentally, like reference numerals are used to refer to like elements used in Embodiment 1 so as to omit or simplify the description.

The auxiliary member 50A includes four positioning portions 51A and a fixing portion 52A. It is noted that three of the positioning portions 51A disposed on both the sides and behind the nozzle 60A are illustrated in this drawing. The fixing portion 52A is formed in a circular shape having a flat front surface 52A1 and a flat rear surface 52A2. Each of the positioning portions 51A is formed in a cylindrical shape. Besides, a rear end of each positioning portion 51A is connected to the outer circumferential surface of the fixing portion 52A. Here, the respective positioning portions 51A are disposed in positions, in a plan view taken from the rear side of the fixing portion 52A, at substantially 90 degrees with each other around the center of the fixing portion 52A.

In the auxiliary member 50A, the fixing portion 52A is sandwiched between and supported by the rear surface of the flange 611 and a step 46 of the connecting section 40. Thus, a distance (height) between the opening 631 of the nozzle 60A and the front end 512 of the positioning portion 51A can be set to a predetermined length. Accordingly, when the creamy substance 4 is squeezed out with the distance and the positional relationship between the opening 631 and the upper plate 31 stably retained by bringing the front ends 512 of the positioning portions 51A into contact with the upper plate 31 of the base 3 of FIGS. 7A to 7D (namely, the creation surface for a cream decoration 81), a beautiful cream decoration 81 can be easily created.

Besides, since the auxiliary member 50A of the present embodiment includes the plural positioning portions 51A, the pastry bag 2A can be prevented from being inclined against the creation surface in using the pastry bag 2A.

Incidentally, when the auxiliary member 50A is fixed outside the nozzle 60A as in the present embodiment, the positioning portion 51A for determining the distance between the nozzle 60A and the base 3 can be formed in another shape such as one or a plurality of columns or plates. In this case, the positioning portion 51A may be provided in a position not coming into contact with the creamy substance 4 having been squeezed out of the pastry bag 2A as illustrated in FIG. 8, or in a position coming into contact with the creamy substance 4 as in Embodiment 1.

Alternatively, the positioning portion 51A may be formed in the shape of a cylindrical wall extending toward the front side from the circular outer edge of the fixing portion 52A. Such a wall can be provided with a slit-shaped cut or made of a transparent material so that the creamy substance 4 squeezed out through the nozzle 60A can be easily visible.

The pastry bags 2 and 2A respectively using the auxiliary members 50 and 50A have been described so far, and the shape of the opening 631 can be, instead of the eight-pointed star, any of star shapes having apexes appropriately increased or decreased in number. Alternatively, the shape of the opening 631 can be any other shape such as a circular shape or a polygonal shape.

Besides, the size, the shape and the number of the contact guides 311 provided on the base 3 can be determined correspondingly to the size, the shape and the number of the tip (the front end 512) of the positioning portion 51 or 51A. Each contact guide 311 can be a projection or a recess to be engaged with the tip of the positioning portion 51 or 51A of the auxiliary member 50 or 50A for reducing its shift in the front-to-back or lateral direction.

Furthermore, each contact guide 311 may include an engaging portion in the shape of a recess or a projection for determining the axial direction of the pastry bag 2 or 2A. For example, the auxiliary member 50A may include a column-shaped direction determining portion extending toward the front side from the outer circumferential surface of a fixing portion 52A, so that the direction determining portion can be engaged with the engaging portion in bringing the positioning portion 51 or 51A into contact with the contact guide 311. Thus, the axial direction of the pastry bag 2 or 2A can be guided to an appropriate position.

Alternatively, the auxiliary member 50 or 50A may be integrally formed with the nozzle 60 or 60A and/or the connecting section 40 or 40A via a portion such as the fixing portion 52 or 52A.

According to the above-described embodiments of the present invention, the following aspects of a pastry bag, an auxiliary member, a decoration forming toy and a decoration forming toy set can be provided:

In a first aspect, a pastry bag includes: a container containing a creamy substance; a nozzle connected to the container; and an auxiliary member including: a fixing portion fixed to the nozzle; and a positioning portion to be brought into contact with a creation surface on which a decoration is to be created.

According to this aspect, a distance between the creation surface and the pastry bag can be stably retained, and therefore, beautiful cream decorations having uniform height and shape can be easily created.

In a second aspect of the pastry bag, the fixing portion is formed in a ring shape, and the auxiliary member is fixed such that the fixing portion is sandwiched between the nozzle and the container.

According to this aspect, the auxiliary member can be more stably fixed on the pastry bag with a simple structure.

In a third aspect of the pastry bag, the container includes a connecting section including a front contact portion at a front end thereof, the nozzle includes a rear contact portion formed inside, and the auxiliary member is fixed such that front and rear portions of the auxiliary member are sandwiched between the front contact portion and the rear contact portion.

According to this aspect, the auxiliary member can be easily fixed within the nozzle.

In a fourth aspect of the pastry bag, the auxiliary member is held within the nozzle, and the positioning portion is formed in a cylindrical shape and protrudes beyond the nozzle.

According to this aspect, the auxiliary member can be disposed in a compact manner by a simple structure. Besides, when the pastry bag is pulled up after squeezing the creamy substance, the cylindrical positioning portion pulls up a pointed tip of the cream decoration, and hence, the decoration can be created without impairing the appearance.

In a fifth aspect of the pastry bag, the auxiliary member includes: a connecting rod connecting the positioning portion and the fixing portion; a front rib formed between a part of the positioning portion on a front side of the connecting rod and a front surface of the connecting rod; and a rear rib connecting a part of the positioning portion on a rear side of the connecting rod and a rear surface of the connecting rod.

According to this aspect, the auxiliary member can be disposed in a passage for the creamy substance within the nozzle. Besides, since a space surrounded by the connecting rod, the fixing portion and the positioning portion defines the passage, a flow of the creamy substance is less impaired. Besides, the strength of the positioning portion formed in a cylindrical shape and the connecting rod formed in a rod shape can be increased. Therefore, even if a pressing load is applied to the auxiliary member when the auxiliary member is brought into contact with the creation surface, damage otherwise caused can be avoided with a simple structure.

In a sixth aspect, an auxiliary member for a pastry bag for squeezing a creamy substance includes: a fixing portion fixed to the pastry bag; and a positioning portion to be brought into contact with a creation surface on which a decoration is to be created.

In a seventh aspect, a decoration forming toy includes: a container containing a creamy substance; a nozzle connected to the container; and an auxiliary member including: a fixing portion fixed the nozzle; and a positioning portion to be brought into contact with a creation surface on which a decoration is to be created.

According to the sixth and seventh aspects, a distance between the creation surface and the pastry bag can be stably retained, and therefore, beautiful cream decorations having uniform height and shape can be easily created.

In an eighth aspect, a decoration forming toy set includes: a decoration forming toy; and a base, in which the decoration forming toy includes: a container containing a creamy substance; a nozzle connected to the container; and an auxiliary member including: a fixing portion fixed to the nozzle; and a positioning portion to be brought into contact with a creation surface on which a decoration is to be created, and the base includes: a contact guide with which a tip of the positioning portion is brought into contact; and an amount guide which guides an amount of squeezing the creamy substance.

According to this aspect, the position of the auxiliary member can be guided by the contact guide, and it can be determined, by using the amount guide, whether or not an appropriate amount of the creamy substance has been squeezed, and therefore, beautiful cream decorations with uniform height and shape can be easily created.

The embodiments of the present invention have been described so far, and it is noted that the present invention is not limited to these embodiments but can be practiced in various aspects.

What is claimed is:

1. A pastry bag comprising:
a container configured to contain a creamy substance;
a connecting section at least partially disposed inside the container and extending outside of the container;
a nozzle connected to the container by the connecting section, the nozzle including an opening through which the creamy substance passes out of the container; and
an auxiliary member at least partially disposed inside of one or both of the connecting section and the nozzle, the auxiliary member comprising:
a fixing portion that holds the auxiliary member to the nozzle;
a positioning portion to be brought into contact with a creation surface on which a decoration is to be created, the positioning portion extending through the opening of the nozzle;
at least one connecting rod connecting the positioning portion and the fixing portion;
at least one front rib formed between a part of the positioning portion on a front side of the connecting rod and a front surface of the connecting rod, the at least one front rib extending from the at least one connecting rod towards the opening of the nozzle; and
at least one rear rib connecting a part of the positioning portion on a rear side of the connecting rod and a rear surface of the connecting rod, the at least one rear rib extending from the at least one connecting rod away from the opening of the nozzle,
wherein the fixing portion is sandwiched between the nozzle and the connecting section.

2. The pastry bag according to claim 1,
wherein the fixing portion is formed in a ring shape, and
wherein the fixing portion is connected to the positioning portion by at least one connecting rod.

3. The pastry bag according to claim 1,
wherein the connecting section comprises a front contact portion at a front end thereof,
wherein the nozzle comprises a rear contact portion formed inside, and
wherein the fixing portion of the auxiliary member is held such that front and rear portions of the fixing portion are sandwiched between the front contact portion of the connecting section and the rear contact portion of the nozzle.

4. The pastry bag according to claim 1,
wherein the auxiliary member is held within the nozzle,
wherein the positioning portion is formed in one of a cylindrical shape, a column shape, and a bar shape, and
wherein the fixing portion is connected to the positioning portion by at least one connecting rod.

5. An auxiliary member for a pastry bag comprising a container configured to contain a creamy substance, a connecting section at least partially disposed inside the container and extending outside of the container, and a nozzle connected to the container by the connecting section, the nozzle including an opening through which the creamy substance passes out of the container, the auxiliary member comprising:

a fixing portion sandwiched between the nozzle and the connecting section;

a positioning portion to be brought into contact with a creation surface on which a decoration is to be created, the positioning portion extending through the opening of the nozzle;

at least one connecting rod connecting the positioning portion and the fixing portion;

at least one front rib formed between a part of the positioning portion on a front side of the connecting rod and a front surface of the connecting rod, the at least one front rib extending from the at least one connecting rod towards the opening of the nozzle; and at least one rear rib connecting a part of the positioning portion on a rear side of the connecting rod and a rear surface of the connecting rod, the at least one rear rib extending from the at least one connecting rod away from the opening of the nozzle.

6. A decoration forming toy comprising:

a container configured to contain a creamy substance;

a connecting section at least partially disposed inside the container and extending outside of the container;

a nozzle connected to the container by the connecting section, the nozzle including an opening through which the creamy substance passes out of the container; and an auxiliary member at least partially disposed inside of one or both of the connecting section and the nozzle, the auxiliary member comprising:

a fixing portion that holds the auxiliary member to the nozzle;

a positioning portion to be brought into contact with a creation surface on which a decoration is to be created, the positioning portion extending through the opening of the nozzle;

at least one connecting rod connecting the positioning portion and the fixing portion;

at least one front rib formed between a part of the positioning portion on a front side of the connecting rod and a front surface of the connecting rod, the at least one front rib extending from the at least one connecting rod towards the opening of the nozzle; and     at least one rear rib connecting a part of the positioning portion on a rear side of the connecting rod and a rear surface of the connecting rod, the at least one rear rib extending from the at least one connecting rod away from the opening of the nozzle, wherein the fixing portion is sandwiched between the nozzle and the connecting section.

7. A decoration forming toy set comprising:

a decoration forming toy; and a base, wherein the decoration forming toy comprises:

a container configured to contain a creamy substance;

a connecting section at least partially disposed inside the container and extending outside of the container;

a nozzle connected to the container by the connecting section, the nozzle including an opening through which the creamy substance passes out of the container; and     an auxiliary member at least partially disposed inside of one or both of the connecting section and the nozzle, the auxiliary member comprising:

a fixing portion that holds the auxiliary member to the nozzle;

a positioning portion to be brought into contact with a creation surface on which a decoration is to be created, the positioning portion extending through the opening of the nozzle;

at least one connecting rod connecting the positioning portion and the fixing portion;

at least one front rib formed between a part of the positioning portion on a front side of the connecting rod and a front surface of the connecting rod, the at least one front rib extending from the at least one connecting rod towards the opening of the nozzle; and         at least one rear rib connecting a part of the positioning portion on a rear side of the connecting rod and a rear surface of the connecting rod, the at least one rear rib extending from the at least one connecting rod away from the opening of the nozzle, wherein the fixing portion is sandwiched between the nozzle and the connecting section, and wherein the base comprises:

a contact guide with which a tip of the positioning portion is brought into contact; and     an amount guide which guides an amount of squeezing the creamy substance.

\* \* \* \* \*